(12) United States Patent
Tanabe et al.

(10) Patent No.: US 8,567,307 B2
(45) Date of Patent: Oct. 29, 2013

(54) SYSTEM FOR CONTINUOUSLY PRODUCING EDIBLE PRODUCT FILLED WITH LIQUID MATERIAL AT CENTER

(75) Inventors: Masaharu Tanabe, Sayama (JP); Minoru Saitou, Sayama (JP); Kyouji Fukuda, Sayama (JP)

(73) Assignee: Lotte Co., Ltd., Tokyo (JP)

( * ) Notice: Subject to any disclaimer, the term of this patent is extended or adjusted under 35 U.S.C. 154(b) by 209 days.

(21) Appl. No.: 13/002,322

(22) PCT Filed: Jun. 30, 2009

(86) PCT No.: PCT/JP2009/062247
§ 371 (c)(1),
(2), (4) Date: Dec. 31, 2010

(87) PCT Pub. No.: WO2010/002018
PCT Pub. Date: Jan. 7, 2010

(65) Prior Publication Data
US 2011/0146504 A1    Jun. 23, 2011

(30) Foreign Application Priority Data

Jul. 2, 2008   (JP) ................. 2008-173366

(51) Int. Cl.
| | |
|---|---|
| *A47J 37/07* | (2006.01) |
| *A21C 9/06* | (2006.01) |
| *A21C 3/00* | (2006.01) |
| *A21C 11/00* | (2006.01) |
| *A01J 25/12* | (2006.01) |
| *A01J 21/00* | (2006.01) |
| *A23G 3/02* | (2006.01) |

(52) U.S. Cl.
USPC .......... 99/450; 99/450.6; 99/450.7; 99/450.8; 425/233; 425/235; 425/345; 426/512

(58) Field of Classification Search
USPC .................... 99/450.6, 450.7, 450.8
See application file for complete search history.

(56) References Cited

U.S. PATENT DOCUMENTS

| | | | | |
|---|---|---|---|---|
| 3,757,676 | A | * | 9/1973 | Pomara, Jr. ................. 99/450.6 |
| 3,806,290 | A | | 4/1974 | Graff et al. |
| 4,015,518 | A | * | 4/1977 | Roth et al. ................... 99/450.6 |
| 4,054,271 | A | * | 10/1977 | Lanzillo ......................... 366/70 |
| 4,469,475 | A | * | 9/1984 | Krysiak ....................... 425/132 |
| 4,715,803 | A | * | 12/1987 | Koppa ...................... 425/133.1 |
| 5,161,458 | A | * | 11/1992 | Cheung ....................... 99/450.6 |
| 6,280,780 | B1 | | 8/2001 | Degady et al. |
| 6,284,291 | B1 | * | 9/2001 | Siecke et al. ..................... 426/5 |
| 6,472,001 | B1 | | 10/2002 | Bunkers et al. |
| 7,264,836 | B2 | * | 9/2007 | McHugh et al. ............. 426/238 |

(Continued)

FOREIGN PATENT DOCUMENTS

| | | |
|---|---|---|
| EP | 0 320 580 A2 | 6/1989 |
| JP | 49-50161 A | 5/1974 |

(Continued)

*Primary Examiner* — Joseph M Pelham
*Assistant Examiner* — Gyounghyun Bae
(74) *Attorney, Agent, or Firm* — Miles & Stockbridge P.C.

(57) ABSTRACT

There is provided a system for continuously producing edible products filled with liquid material at the center, having a high liquid material filling factor without leakage of liquid material. The system for continuously producing edible products filled with liquid material at the center is characterized in that atmospheric air is sucked in extrusion of an edible product rope.

8 Claims, 3 Drawing Sheets

(56) References Cited

U.S. PATENT DOCUMENTS

| | | |
|---|---|---|
| 7,337,708 B2 * | 3/2008 | Rothamel et al. ............ 99/450.7 |
| 2007/0231426 A1 | 10/2007 | Acar et al. |
| 2008/0050483 A1 * | 2/2008 | Fornaguera ................... 426/284 |
| 2008/0107771 A1 * | 5/2008 | Fabre et al. ....................... 426/5 |

FOREIGN PATENT DOCUMENTS

| | | |
|---|---|---|
| JP | 01-168243 A | 7/1989 |
| JP | 11-137231 A | 5/1999 |
| WO | WO 2009/020219 A1 | 2/2009 |
| WO | WO 2009/020227 A1 | 2/2009 |

* cited by examiner

SYSTEM FOR CONTINUOUSLY PRODUCING EDIBLE PRODUCT FILLED WITH LIQUID MATERIAL AT CENTER

TECHNICAL FIELD

The present invention relates to a system for producing edible products filled with liquid material, and more particularly to a system for continuously producing edible products filled with liquid material containing air at the center.

BACKGROUND ART

In recent years, there has been an increasing need for liquid-filled gum or center-filled gum and other confectionery products. These products generally include a solid outer part, that is, an outer shell and a soft liquid center part. The outer part may be made of some type of chewing gum, bubblegum, candy, or material containing flour as a main ingredient, while the liquid center part may generally be made of flavored material having a syrup-like viscosity.

Various studies have been made today on gum compositions filled with liquid at the center (International Publications No. WO2009/020219 and No. WO2009/020227). Further, many mechanisms and systems have been known for producing liquid-filled gum and other confectionery products Japanese Patent Applications Laid-open No. 2004-506434 and No. 2004-508024).

Japanese Patent Application Laid-open No. 2004-506434 discloses a system for continuously producing coated pieces of liquid-filled gum material comprising: an extruder and center-fill mechanism for continuously producing a rope of center-filled gum material; a tablet-forming mechanism having a first rotating chain member with a plurality of die groove members thereon and a second chain mechanism having a second plurality of die groove members thereon, said first and second plurality of die groove members being positioned to mate forming die cavities for formation of individual pieces of tablet-type gum material; a cooling mechanism for cooling the formed pieces of center-filled gum material; and a coating mechanism for applying a hard coating to the formed pieces of gum material; the die groove members each having surfaces of substantially curved configurations wherein pieces of liquid-filled gum material are formed having curved and non-flat outer configurations.

Japanese Patent Application Laid-open No. 2004-508024 discloses a system for continuously producing pieces of liquid-filled gum material comprising: a rotating drum mechanism, the drum mechanism having a die ring member and a cutter ring member; the die ring member having a first plurality of die half members positioned around its outer periphery; the cutter ring member having a second plurality of die half members positioned on its inner periphery, one of the second plurality of die half members mating with one of the first plurality of die half members to form circular die cavities as the drum mechanism rotates; each of the mating pairs of die half members having a pair of plunger members associated therewith for entering the mated die half members and compressing pieces of gum material positioned therein, and cam mechanisms for operating the plunger members; cooling means for cooling the first and second plurality of die half members with a cooled fluid in order to minimize sticking of the gum material to the die half members; and heating means for maintaining the plunger members and cam mechanisms at temperatures above the temperatures of said first and second plurality of die half members.

However, construction of a system for continuously producing gum products filled with liquid at the center requires a further increase in liquid filling factor and measures to prevent leakage of liquid filled in gum in a conventional method.

DISCLOSURE OF THE INVENTION

The conventional system for producing gum products filled with liquid at the center (liquid-centered gum) produces gum products by discharging a gum rope filled with only liquid in a process of preparing a liquid-containing gum rope, and forming and cutting the gum rope into pillow shaped pieces after cooling. However, this production system often produces gum products with leakage of liquid in gum after formation.

A center-filled gum product is formed as a product having a thin part, and when a gum material piece is simultaneously compressed by two plunger members that form a final shape of the product, center material of the liquid may leak or be squeezed from the gum material piece. A gum piece with leakage (referred to as "object with leakage") is undesirable because leaking liquid material may cause problems in operation of a machine and problems in further transport and packaging of the gum piece. A formed gum product with leakage is generally unacceptable as a commercial product. It is clear that when a user handles a center-filled gum piece with leakage, the user gets soiled inconveniently.

Further, the liquid leakage reduces the yield of final gum products, and also causes inconvenience in terms of maintaining gum properties.

Therefore, the inconvenience caused by the liquid leakage is desired to be eliminated.

The present invention has an object to increase a liquid material filling factor of such a liquid material-filled edible product and prevent leakage of liquid material.

The above described object is achieved by a unique and novel liquid material-filled edible product forming apparatus, system and process according to the present invention.

The present invention includes an extrusion, size adjustment and pellet forming system that produces a pellet liquid material-filled edible product with the center being filled more quickly and efficiently at lower cost. The liquid material-filled edible product forming system includes an extruder and center-fill system that can obtain a center-filled edible product material extruded into a rope shape or a strand shape.

The present invention relates to a system for continuously producing edible products filled with liquid material at the center, characterized in that filling of the liquid material and suction of atmospheric air are simultaneously performed in extrusion of an edible product rope.

The present invention also relates to a system for continuously producing edible products filled with liquid material at the center, characterized in that a nozzle (referred to as "inner nozzle") that fills liquid material is provided in a nozzle (referred to as "outer nozzle") that discharges edible products, and a tube that sucks air is placed in the inner nozzle.

The present invention further relates to the system characterized in that the tube that sucks air does not have an apparatus that forcedly feeds air.

The present invention further relates to the above described system wherein the liquid material is selected from the group consisting of syrup containing sugars or sugar alcohol as a main ingredient, material made of fruit, vegetable or the like processed into liquid, and chocolate or chocolate products, and the edible product is selected from the group consisting of candy, chewing gum, and material containing flour as a main ingredient.

The present invention further relates to the above described system characterized in that the outer nozzle has an oval or circular shape, an area of 40 to 70 mm$^2$ and a component ratio of 50 to 80%, the inner nozzle has an oval or circular shape, an area of 10 to 30 mm$^2$ and a component ratio of 18 to 40%, and the air tube has an oval or circular shape, an area of 1 to 7 mm$^2$ and a component ratio of 2 to 10%.

The present invention further relates to the above described system characterized in that the outer nozzle has an oval or circular shape, an area of 52 to 55 mm$^2$ and a component ratio of 65 to 74%, the inner nozzle has an oval or circular shape, an area of 15 to 24 mm$^2$ and a component ratio of 22 to 29%, and the air tube has an oval or circular shape, an area of 3 to 5 mm$^2$ and a component ratio of 4 to 6%.

BEST MODES FOR CARRYING OUT THE INVENTION

Figure 1:
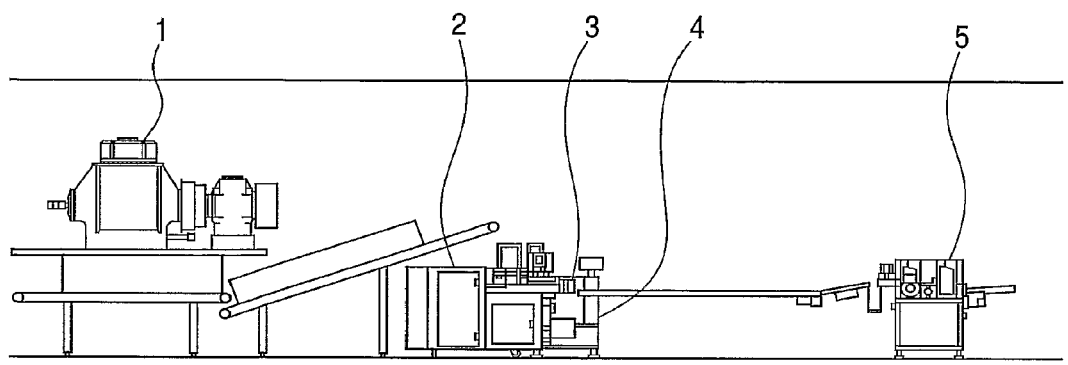
FIG. 1 is a schematic view of a method, system and apparatus according to the present invention.

FIG. 1 is a schematic view of a method, system and apparatus according to the present invention.

Reference numeral 1 denotes a mixer for mixing edible product material. Reference numeral 2 denotes an extruder, 3 denotes a nozzle of the extruder, and 4 denotes a center filler for feeding liquid material. A rope of an air-in liquid material-filled edible product is prepared and extruded by the extruder. Reference numeral 5 denotes a shaping station, which includes a side edge cutter for cutting a fed air-in liquid material-filled edible product rope, and separates the rope into individual pieces of air-in liquid material-filled edible products by these processes.

The extruder 2 includes an air-in liquid-fill mechanism. The air-in liquid-fill mechanism is used for inserting air and a flow of liquid material into the center of edible product material when the edible product material is formed and extruded by the extruder. Generally, a mechanism for gum filled with liquid at the center (so-called liquid-centered gum) and other confectionery products has been known in this technical field (Japanese Patent Applications Laid-Open No. 2004-506434 and No. 2004-508024).

However, an air-in liquid-fill mechanism for an edible product filled with liquid at the center and further containing air in the liquid (so-called an air-in liquid material-filled edible product) as in the present invention has not been known.

Next, the air-in liquid-fill mechanism for the air-in liquid material-filled edible product according to the present invention will be described below in detail.

Figure 2A:
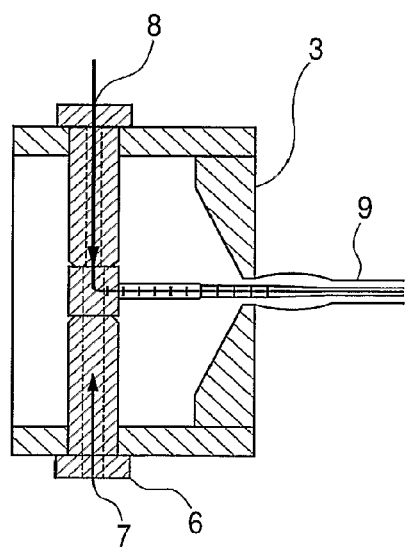
FIGS. 2A and 2B are schematic views of an air-in liquid-fill mechanism in preparing an air-in liquid material-filled edible product according to present invention.

The nozzle portion 3 of the extruder 2 is improved as shown in FIG. 2A. In the nozzle portion of the extruder, a liquid material introducing pipe 6 is provided perpendicularly to a direction of extruding a filled edible product and preparing an edible product rope 9. The liquid material introducing pipe is provided for introducing liquid material 7 from below into gum perpendicularly to the direction of extruding the edible product rope.

Further, an air intake tube 8 for introducing air into liquid material in the edible product is provided above the liquid material introducing pipe.

Figure 2B:
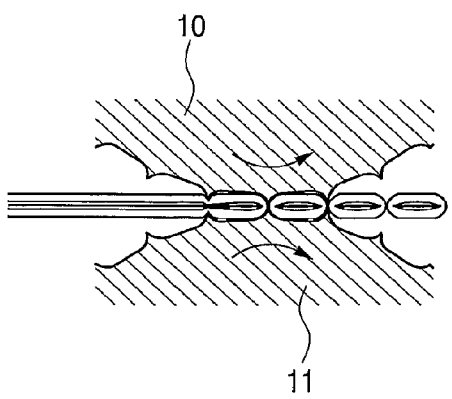

The liquid material introducing pipe 6 and the air intake tube 8 are bent in a feeding direction of the edible product rope at a central axis of the feeding direction and feed the liquid material and air into the edible product rope, and thus the air-in liquid material-filled edible product rope 9 is extruded and prepared. The prepared air-in liquid material-filled edible product rope is conveyed and introduced into a side edge cutter including an upper roll 10 and a lower roll 11 in FIG. 2B. The conveying speed is 10 to 20 m/min. Then, the side edge cutter that cuts the edible product portion while pressure bonding the edible product portion separates the air-in liquid material-filled edible product rope into individual edible product pieces to prepare air-in liquid material-filled edible product pieces.

Figure 3A:
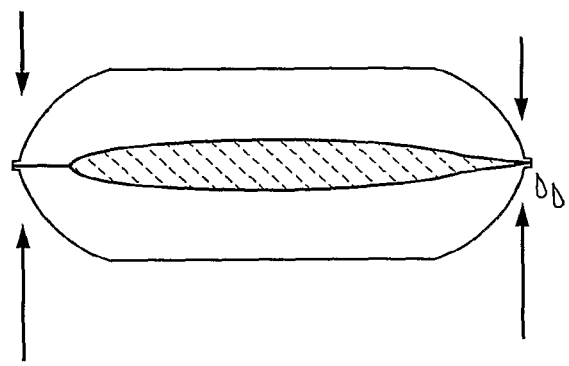
FIG. 3A is a sectional view of gum showing liquid leakage of liquid-centered gum according to a conventional method.

For conventional liquid-centered gum produced using an extruder that does not include an air intake tube as in the present invention, in forming a rear side of a gum rope in a conveying direction into a pillow shape and cutting the gum rope into individual pieces, liquid filled on a front side of the liquid-centered gum rope in the conveying direction is extruded to easily cause liquid leakage (FIG. 3A).

Figure 3B:
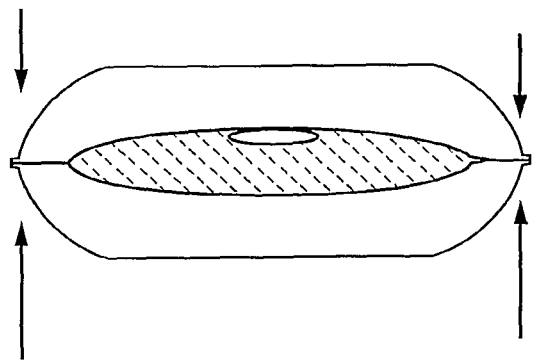
FIG. 3B is a sectional view of gum showing air-in liquid-centered gum according to the present invention.

However, as in the present invention, the air intake tube is incorporated into the extruder mechanism to prepare the air-in liquid material-filled edible product rope as described above and obtain final individual air-in liquid material-filled edible product pieces by a successive continuous production method. In this case, liquid material does not leak from the edible product pieces (FIG. 3B).

The liquid material does not leak from the air-in liquid material-filled edible product obtained by the method of the present invention. This may be because atmospheric air is injected simultaneously with injection of liquid material to form space in a liquid material region in the edible product, and thus pressure on the liquid material in forming can be released into the space to noticeably reduce pressure on the entire formed edible product, and the pressure can be released to the side of the air-in liquid material-filled edible product rope connecting to the atmosphere, thereby preventing the leakage of the liquid material.

Thus, the present invention has a noticeable technical feature that the method of simultaneously sucking atmospheric air and liquid material into the edible product rope is used to ensure space in the edible product rope to reduce pressure on the liquid material in forming and cutting to prevent leakage of the liquid material to the outside.

Next, modification of the nozzle of the extruder according to the present invention will be described.

Modification of air-in nozzle component of edible product forming setup:

An inner nozzle securing component was drilled to insert an air intake tube. The machined component was placed on an upper portion of an inner nozzle of an extruder, and a resin tube was inserted into the machined component as the air intake tube and secured.

Modification of air-in nozzle of edible product forming setup:

(i) A liquid material introducing pipe was placed below the extruder.

(ii) The inner nozzle was secured to the extruder, and an atmospheric air introducing resin tube was inserted into the inner nozzle.

(iii) The air introducing tube was passed through an upper portion of the extruder, and a pipe modified to secure the tube was placed.

(iv) Finally, an outer nozzle for an edible product was mounted to the extruder to complete an air-in nozzle configuration.

Various types of inner nozzles of the extruder were fabricated as listed below, and nozzle portions that can provide a preferable air-in liquid material-filled edible product were studied.

In all tests, syrup containing sugar alcohol as liquid material was used, and chewing gum was used as an edible product.

Comparative Example 1

Test 1 (without air-in) was conducted using an inner nozzle (liquid injection portion) having a circular shape of 13 mm$^2$ (component ratio of 20%) and an outer nozzle (gum discharge portion) having an oval shape of 53 mm$^2$ (component ratio of 80%).

Figure 4A:
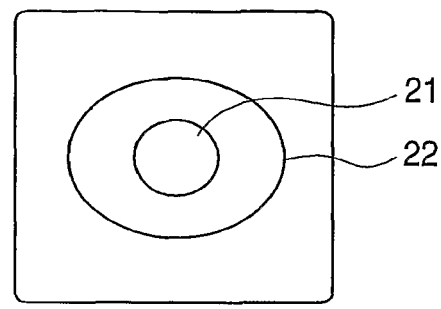
FIG. 4A is a plan view of a nozzle portion used in preparation in Test 1.

A plan view of the nozzle portion used in preparation in Test 1 is shown in FIG. 4A. In FIG. 4A, reference numeral 21 denotes the inner nozzle, and reference numeral 22 denotes the outer nozzle.

In this case, a liquid filling factor in gum was 6% and a leakage rate was 90%.

Comparative Example 2

Test 2 (without air-in) was conducted for reducing the leakage rate in Test 1. Test 2 was conducted using an inner nozzle (liquid injection portion) having an oval shape of 20 mm$^2$ (component ratio of 30%) and an outer nozzle (gum discharge portion) having an oval shape of 46 mm$^2$ (component ratio 70%).

Figure 4B:
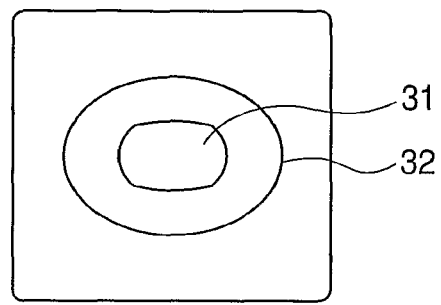
FIG. 4B is a plan view of a nozzle portion used in preparation in Test 2.

A plan view of the nozzle portion used in preparation in Test 2 is shown in FIG. 4B. In FIG. 4B, reference numeral 31 denotes the inner nozzle, and reference numeral 32 denotes the outer nozzle.

In this case, a liquid filling factor in gum was 6% and a leakage rate was 60%.

When a space factor (liquid injection portion) in a gum rope was increased, a gum rope coming out of a main extract nozzle was inconveniently crushed. This prevented improvement of the leakage rate.

Comparative Example 3

Test 3 was conducted using an inner nozzle (liquid injection portion) having an oval shape of 15 mm$^2$ (component ratio of 22%), an outer nozzle (gum discharge portion) having an oval shape of 52 mm$^2$ (component ratio of 74%), and an air tube (forced air) having a circular shape of 3 mm$^2$ (component ratio of 4%) to forcedly inject air into a gum rope and try to ensure space.

Figure 4C:
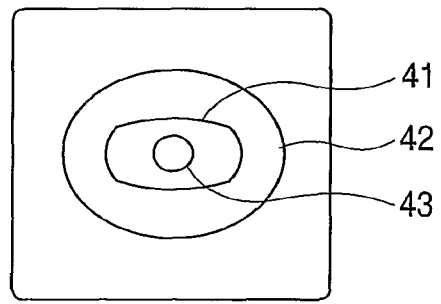
FIG. 4C is a plan view of a nozzle portion used in preparation in Tests 3 and 4.

A plan view of the nozzle portion used in preparation in Test 3 is shown in FIG. 4C. In FIG. 4C, reference numeral 41 denotes the inner nozzle, reference numeral 42 denotes the outer nozzle, and reference numeral 43 denotes the air tube.

In this case, a liquid filling factor was 8 to 10% and a leakage rate was 50%.

In Test 3, compressed air of 0.05 to 0.1 Mpa was fed to ensure space in the gum rope filled with liquid, but pressure in forming could not be released to the side of the gum rope. This prevented improvement of the leakage rate.

Example 1

Test 4 was conducted by taking in atmospheric air rather than air forcedly taken from the air tube under the nozzle conditions in Test 3.

In this case, a liquid filling factor was 8 to 10% and a leakage rate was 3% or less.

In Test 4, unlike Tests 2 and 3, space in a gum rope could be ensured and pressure in forming could be released, thereby obtaining an ideal air-in structure.

Example 2

Test 5 was conducted using an inner nozzle (liquid injection portion) having an oval shape of 24 mm$^2$ (component ratio of 29%), an outer nozzle (gum discharge portion) having an oval shape of 55 mm$^2$ (component ratio of 65%), and an air tube (atmospheric air) having a circular shape of 5 mm$^2$ (component ratio of 6%) to introduce space in liquid.

Figure 4D:
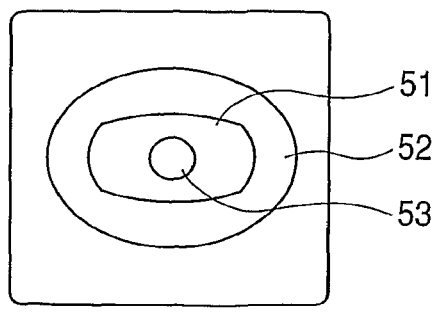
FIG. 4D is a plan view of a nozzle portion used in preparation in Test 5.

A plan view of the nozzle portion used in preparation in Test 4 is shown in FIG. 4D. In FIG. 4D, reference numeral 51 denotes the inner nozzle, reference numeral 52 denotes the outer nozzle, and reference numeral 53 denotes the air tube.

In this case, a liquid filling factor was 12 to 20% and a leakage rate was 3% or less, and thus liquid leakage could be noticeably prevented.

For the conventional liquid-centered gum, the liquid filling factor was 1 to 30% and the liquid leakage rate was 90%. Further, when the oval nozzle was used, the liquid filling factor was 1 to 30% and the liquid leakage rate was 60%. On the other hand, for the air-in liquid-centered gum of the present invention using the oval nozzle and the air-in configuration, the liquid filling factor was 1 to 30% and the liquid leakage rate was 3% or less, and thus the liquid leakage rate could be noticeably reduced.

The above described embodiment is shown merely by way of specific example in carrying out the present invention, and a technical scope of the present invention should not be restrictively construed by the embodiment. Specifically, the present invention may be carried out in various manners without departing from the technical idea or main features thereof.

This application claims the benefit of Japanese Patent Application No. 2008-173366, filed Jul. 2, 2008, which is hereby incorporated by reference herein in its entirety.

The invention claimed is:

1. A system for continuously producing edible products filled with liquid material at the center,
   characterized in that filling of the liquid material and suction of atmospheric air are simultaneously performed in extrusion of the edible products.

2. A system for continuously producing edible products filled with liquid material at the center,
   characterized in that an inner nozzle that discharges liquid material is provided in an outer nozzle that discharges edible products, and an air tube that sucks air is placed in the inner nozzle.

3. The system according to claim 2, characterized in that the air tube that sucks air does not have an apparatus that forcedly feeds air.

4. The system according to claim 1, wherein said liquid material is selected from the group consisting of syrup containing sugars or sugar alcohol as a main ingredient, material made of fruit, vegetable or the like processed into liquid, and chocolate or chocolate products, and said edible product is selected from the group consisting of candy, chewing gum, and material containing flour as a main ingredient.

5. The system according to claim 2, characterized in that said outer nozzle has an oval or circular shape, an area of 40 to 70 mm$^2$ and a component ratio of 50 to 80%,
said inner nozzle has an oval or circular shape, an area of 10 to 30 mm$^2$ and a component ratio of 18 to 40%, and
said air tube has an oval or circular shape, an area of 1 to 7 mm$^2$ and a component ratio of 2 to 10%.

6. The system according to claim 5, characterized in that said outer nozzle has an oval or circular shape, an area of 52 to 55 mm$^2$ and a component ratio of 65 to 74%,
said inner nozzle has an oval or circular shape, an area of 15 to 24 mm$^2$ and a component ratio of 22 to 29%, and
said air tube has an oval or circular shape, an area of 3 to 5 mm$^2$ and a component ratio of 4 to 6%.

7. The system according to claim 2, wherein said liquid material is selected from the group consisting of syrup containing sugars or sugar alcohol as a main ingredient, material made of fruit, vegetable or the like processed into liquid, and chocolate or chocolate products, and said edible product is selected from the group consisting of candy, chewing gum, and material containing flour as a main ingredient.

8. The system according to claim 3, wherein said liquid material is selected from the group consisting of syrup containing sugars or sugar alcohol as a main ingredient, material made of fruit, vegetable or the like processed into liquid, and chocolate or chocolate products, and said edible product is selected from the group consisting of candy, chewing gum, and material containing flour as a main ingredient.

* * * * *